GEORGE L. PERRY.
Improvement in Clod Fenders.
No. 118,267. Patented Aug. 22, 1871.
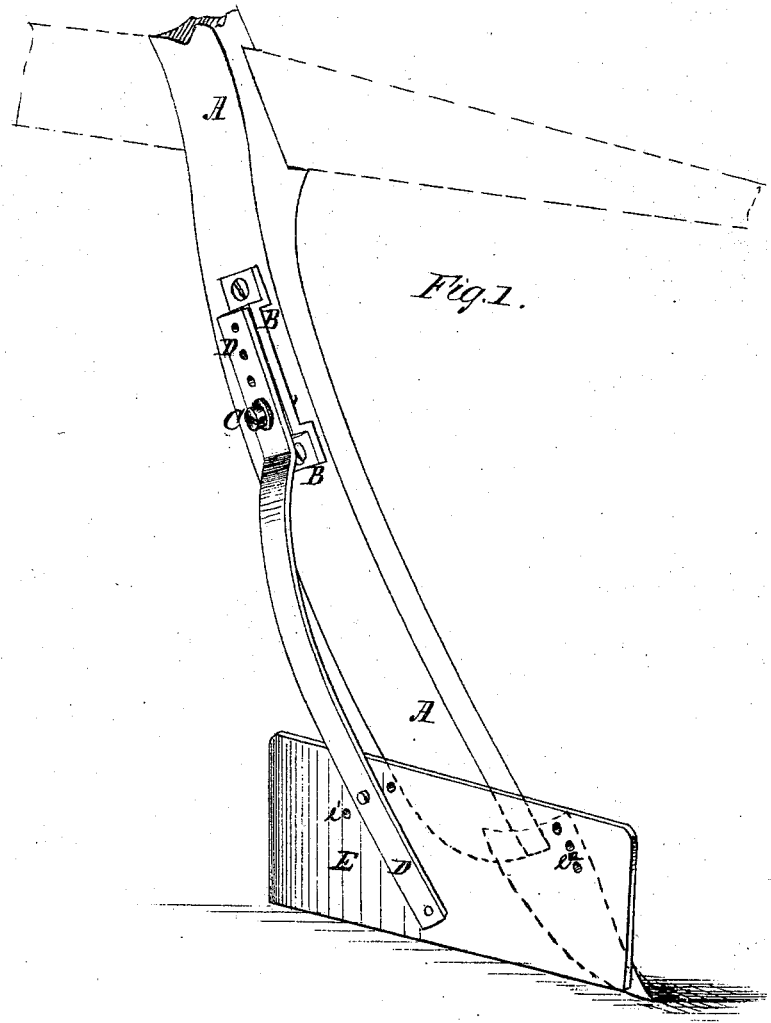
Fig. 1.
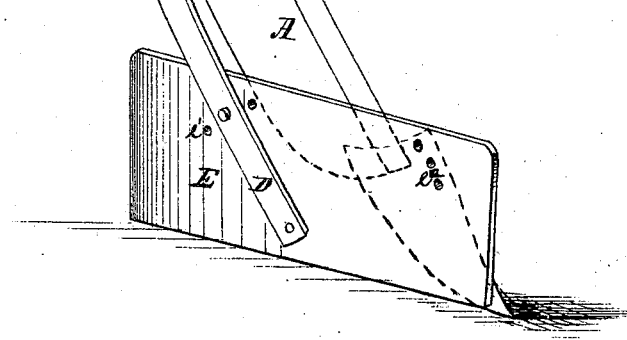
Fig. 2.
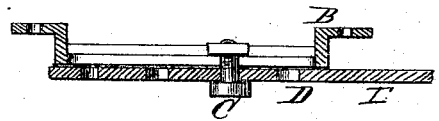
Witnesses:
Inventor:
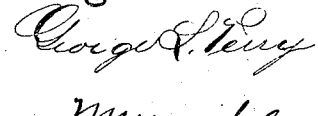
Per Attorneys.

UNITED STATES PATENT OFFICE.

GEORGE L. PERRY, OF BERLIN, WISCONSIN.

IMPROVEMENT IN CLOD-FENDERS.

Specification forming part of Letters Patent No. 118,267, dated August 22, 1871.

*To all whom it may concern:*

Be it known that I, GEORGE L. PERRY, of Berlin, in the county of Green Lake and State of Wisconsin, have invented a new and useful Improvement in Corn-Shield; and I do hereby declare that the following is a full, clear, and exact description thereof, which will enable others skilled in the art to make and use the same, reference being had to the accompanying drawing forming part of this specification, in which—

Figure 1 represents my improved corn-shield as attached to a plow-standard. Fig. 2 is a detail sectional view of the bracket and upper part of the bar of the corn-shield.

Similar letters of reference indicate corresponding parts.

My invention has for its object to furnish an improved corn-shield which shall be so constructed as to effectually protect the corn from being covered or injured by the dirt or clods thrown toward it by the plow, which shall be simple and inexpensive in construction, and at the same time so constructed that it may be conveniently raised or lowered, or adjusted at a greater or lesser angle with its bar, or adjusted for attachment to either side of the plow; and it consists in the corn-shield, constructed as hereinafter more fully described.

A represents the standard of a double-shovel cultivator, to the side of which is attached a bracket, B, by two screws which pass through holes in the ends of the said bracket and into the said standard. The bracket B is made with an offset near each end to raise its body away from the standard A. The bracket B is slotted longitudinally, and is grooved or rabbeted upon its inner side, along the edge of the said slot, to form a channel or way for the head or nut of the bolt C that secures the bar D to the said bracket B. D is a bar, which is made in about the form shown in Fig. 1—that is to say, is so bent as to bring its lower part into proper position to receive the plate E. In the upper part of the bar D are formed several holes to receive the bolt C, so that the shield may be raised and lowered by sliding the said bolt C up and down in the slot of the bracket B; and, when a still greater adjustment may be required, by shifting the bolt C from one to the other of the said holes in the bar D. The shield-plate E is pivoted to the lower end of the bar D by a rivet or bolt that passes through the lower end of the bar D, and through a hole near the lower edge of the middle part of the said plate E. The bar D is also connected with the rear upper part of the plate E by a bolt or rivet that passes through a hole in the bar D, and through one or the other of the holes $e'$ in the said plate, several holes being formed in the plate E to receive the said bolt or rivet, so that the position of the plate E may be adjusted upon the bar D, according to the position of the plow-standard, to bring it into proper position with respect to the surface of the ground. By moving the upper rivet or bolt from the holes $e^1$ to the holes $e^2$ the device will be adjusted to adapt it for attachment to the other side of the cultivator.

Having thus described my invention, I claim as new and desire to secure by Letters Patent—

An improved corn-shield, consisting of the bracket B, bolt C, bar D, and plate E, said parts B C D E being constructed and operating in connection with each other, substantially as herein shown and described, and for the purpose set forth.

GEORGE L. PERRY.

Witnesses:
J. N. ROGERS,
A. PERRY.